April 8, 1930.  G. W. PERKS  1,753,349
TRACTION DEVICE
Filed Feb. 1, 1927  2 Sheets-Sheet 1

INVENTOR.
GEORGE W. PERKS
BY Ely T Barrow
ATTORNEYS.

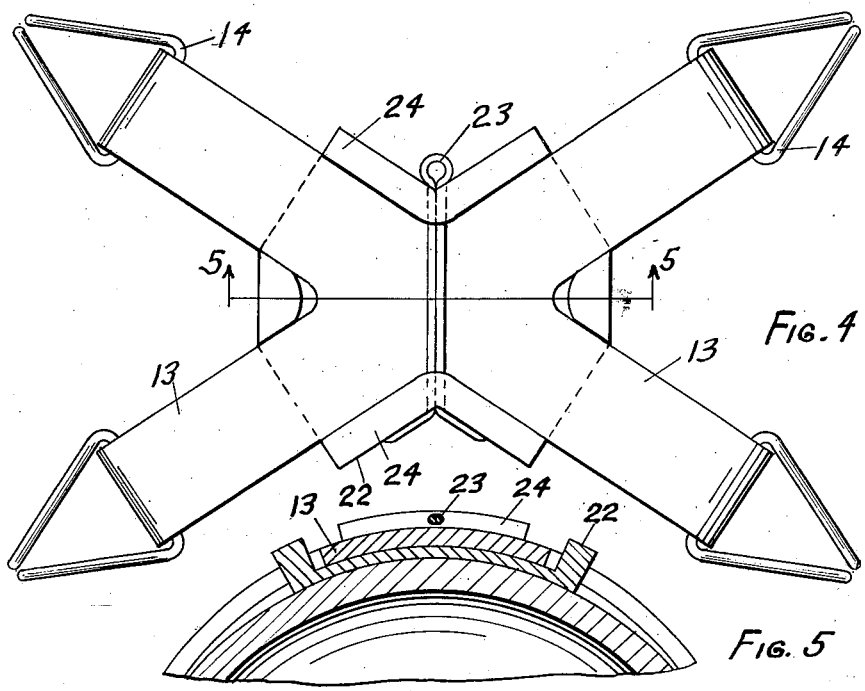
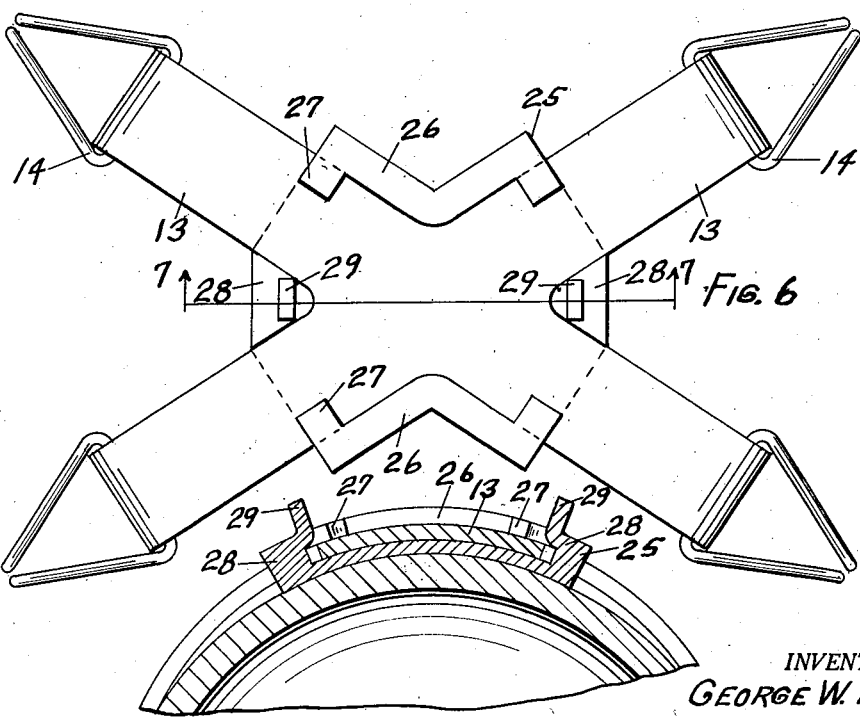

Patented Apr. 8, 1930

1,753,349

UNITED STATES PATENT OFFICE

GEORGE W. PERKS, OF AKRON, OHIO, ASSIGNOR TO JOHN R. GAMMETER, OF AKRON, OHIO

TRACTION DEVICE

Application filed February 1, 1927. Serial No. 165,091.

This invention relates to traction devices for rubber tired vehicle wheels.

The general purpose of the invention is to provide an improved traction device capable of preventing skidding on wet, muddy, snow-covered and particularly icy roads or streets.

The invention contemplates a traction chain adapted to be mounted about a vehicle tire and including spaced, circumferential, flexible elements or chains connected by flexible, resilient, transverse members of comparatively high tensile strength sufficient to effectively withstand the driving forces reacting thereon as the vehicle is being driven and having thereon cleats of long-wearing metal adapted to cut into slippery roads or pavements to prevent skidding.

More particularly, the invention is directed to an improvement in a known type of traction device including spaced, circumferential chains and transverse straps of rubber and fabric which are capable of long wear under the driving stresses acting thereon, said improvement being the provision of cleats secured upon the rubber straps, these cleats preferably being of a wear-resisting metal such as pressed steel.

A further object of the invention is the provision of cleats adapted to be removably secured on the transverse straps so as to be capable of replacement when worn out.

The foregoing and other objects of the invention are attained by the constructions illustrated in the accompanying drawings and described below. It is to be understood that the invention is not limited to the particular forms thereof shown and described.

Of the accompanying drawings,

Figure 4 is a plan of another form of traction element;

Figure 5 is a section on line 5—5 of Figure 4 showing the element on a tire in section;

Figure 6 is a plan of a third form of traction element;

Figure 7 is a section on line 7—7 of Figure 6 showing the element on a tire in section;

Figures 8, 9:
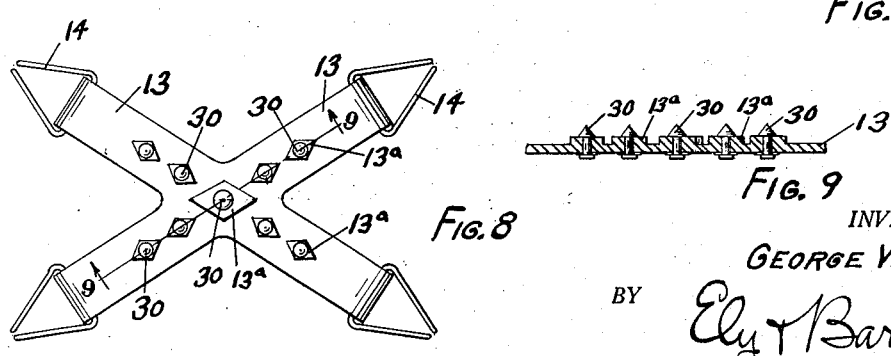
Figure 8 is a reduced plan of a fourth form of the invention.
Figure 9 is a section on line 9—9 of Figure 8.

Referring to the drawings, the numeral 10 designates a vehicle wheel having a tire 11 thereon about which is mounted a traction device including side chains, such as indicated at 12, and transverse traction elements of rubber and fabric 13, 13 connected thereto by hook members 14, 14. The elements 13 are preferably in the form of Greek crosses, are flexible and resilient and capable of withstanding severe tensile stresses. These elements may or may not be formed with non-skid projections such as shown at 13ª, 13ª (Figures 8 and 9).

Figure 1:
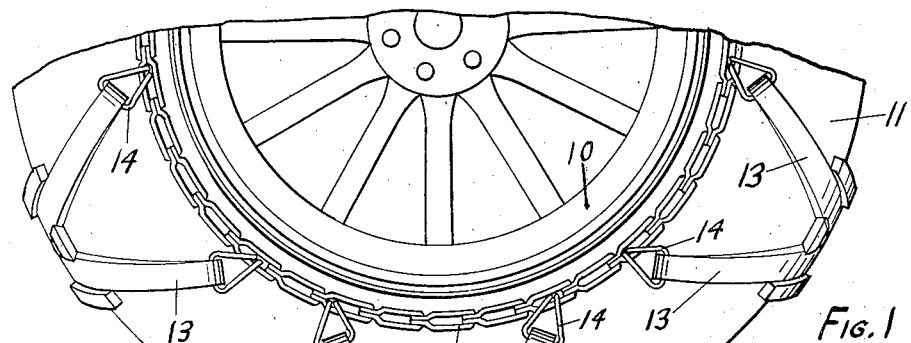
Figure 1 is a side elevation of a portion of a vehicle wheel having the improved traction device mounted thereon.
Figure 2:
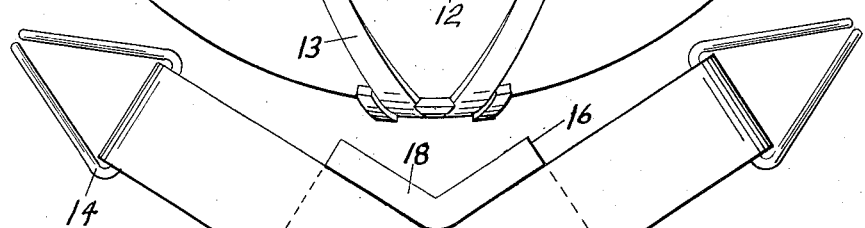
Figure 2 is a plan of one transverse traction element.
Figure 3:
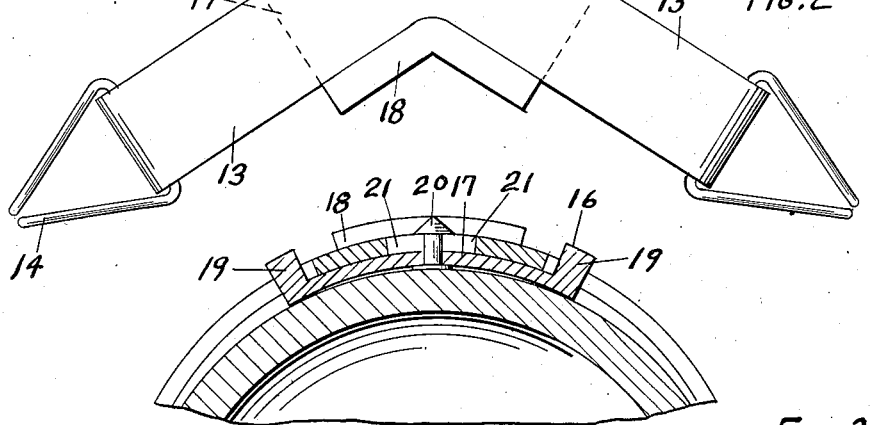
Figure 3 is a section on line 3—3 of Figure 2 showing the element on a tire in section.

In the form of the invention shown in Figures 1 to 3, metal cleats 16 are shown, each including a backing plate 17, flanges 18, 18 of V-shape form fitting against the forward and rear edges between the arms of the transverse elements, and lugs 19, 19 of rounded wedge shape projecting from the backing plate against the side edges between the arms of the elements, the flanges 18 and lugs 19 being of such height as compared with the thickness of the elements as to extend beyond the traction surfaces of such elements (Figure 3). The angular edges of flanges 18 and lugs 19 effectively prevent skidding in any direction.

The cleats 16 in this form of the invention are secured upon the transverse elements 13 by conical headed rivets 20. To render the cleats readily removable and replaceable, the elements 13 may be preliminarily apertured to receive the shank of the rivet and may be slotted on each side of the aperture at 21, 21 so that the head of the rivet may be forced through the aperture to secure the cleat to the element.

In Figures 4 and 5, cleats 22, similar to cleats 16, are removably secured on the transverse elements 13 by cotter pins 23 inserted through apertures in flanges 24, 24.

Other means for securing cleats, such as 16, in place may be provided. For example, in Figures 6 and 7, cleats 25 are provided with flanges 26, 26 having lugs 27, 27 thereon adapted to project over the arms of cross member 13 and lugs 28, 28 are formed with portions 29 originally formed to extend outwardly therefrom and adapted to be bent down over the central portion of element 13. In this construction the cleat may be applied by first flexing the elements 13 so as to slip their forward and rear edges under lugs 27 and then bending down the portions 29 over the side edges of the elements.

Figures 8 and 9 illustrate a form of the invention in which cleats 30, 30 in the form of conical headed rivets are secured in the central portion and arms of elements 13. These may be secured in the center of non-skid rubber projections 13ª, 13ª formed on elements 13.

In all forms of the invention the rubber and fabric elements absorb the driving strains and stresses while the cleats afford the desired safe traction. These cleats are accordingly made of metal of a high degree of hardness such as pressed steel.

Modifications of the invention other than those disclosed herein may be resorted to without departing from the spirit thereof or the scope of the appended claims.

What is claimed is:

1. A traction device for vehicle wheels comprising an element adapted to extend transversely about a tire, said element being of flexible, resilient, non-metallic, strain-resisting material constructed in the shape of a cross, a metal cleat secured on the element, said cleat comprising a backing plate and projections on the plate fitting about the element between the arms of the cross and extending beyond the traction surfaces of the element, and means for securing said cleat on the element.

2. A traction device for vehicle wheels comprising an element adapted to extend transversely about a tire, said element being of flexible, resilient, non-metallic, strain-resisting material, a metal cleat removably secured on the element, said cleat comprising a backing plate and projections on the plate fitting about the element and extending beyond the traction surfaces of the element, and means for removably securing said cleat on the element.

3. A traction device including traction elements adapted to be secured about a tire on a wheel, said elements being of flexible, non-metallic, strain-resisting material formed in cross shape, and hard metal cleats secured thereto and having angular projections thereon extending between the arms of the elements beyond the traction surface of said elements.

4. A traction device for vehicle wheels comprising an element adapted to extend transversely about a tire, said element being of flexible, resilient, non-metallic, strain-resisting material constructed in the shape of a cross, a metal cleat secured on the element, said cleat comprising a backing plate mounted under the element and projections on the plate extending beyond the traction surfaces of the element, and means for securing said cleat on the element.

GEORGE W. PERKS.